ABSTRACT OF THE DISCLOSURE

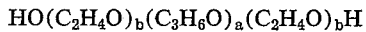

Physiological salt solutions of certain ethylene oxide-polypropylene glycol condensation products have been found to be particularly effective as blood plasma substitutes. These solutions may be employed in the treatment of shock, in transfusion reactions, and as priming agents in the heart-lung apparatus.

---

This application is a continuation-in-part of copending U.S. patent application Ser. No. 670,453, filed Sept. 25, 1967 now abandoned.

The present invention relates to novel pharmacological compositions. More particularly, the invention relates to physiological salt solutions of certain ethylene oxide-polypropylene glycol condensation products, which solutions find particular utility for intravenous use in human beings, particularly as blood plasma substitutes in the treatment of shock, in transfusion reactions, and as a priming agent in the heart-lung apparatus.

Because of the high cost and scarcity of blood plasma, the art has long been in need of a material which will perform as a substitute therefor. To be useful as a blood plasma substitute, a material must possess the following properties: (1) it must retain a sufficient molecular size to remain in the blood space, thus creating an osmotic pressure great enough to retain the solvent (water) within the circulation, (2) it must be miscible with blood, (3) it must be non-antigenic, non-toxic, and non-pyretogenic, (4) it must not draw water from the cellular area of the body, (5) it must be readily available and stable under prolonged storage conditions, and (6) when no longer needed, it must be readily discharged from the body circulation. With such formidable requirements, it is little wonder that the art has not heretofore found any material which satisfactorily performs as a blood plasma substitute. This is so notwithstanding the fact that various materials such as salt solutions, gelatin derivatives, and various proteins and derivatives thereof, mannitol, starch and dextrans have been investigated as blood plasma substitutes. However, these materials all lack one or more of the above requirements, thereby rendering them not totally acceptable as blood plasma substitutes.

It is an object of the present invention to provide a composition which is an effective substitute for blood plasma. It is a further object of the present invention to provide a composition comprising a physiological salt solution of certain ethylene oxide-polypropylene glycol condensation products, which composition may be advantageously employed as a blood plasma substitute, particularly in the treatment of shock and in the heart-lung apparatus. Other objects of the invention will become apparent from the specification and examples which follow.

The above objects of the present invention are accomplished by a composition comprising a physiological salt solution containing from 0.375 to 1.5 millimoles/liter of a compound of the formula $$HO(C_2H_4O)_b(C_3H_6O)_a(C_2H_4O)_bH$$

wherein $a$ is an integer such that the hydrophobe base represented by $(C_3H_6O)$ has a molecular weight of from 950 to 4000, preferably from 1750 to 4000, and $b$ is an integer such that the hydrophile portion represented by $(C_2H_4O)$ constitutes from about 50% to 90% by weight of the compound. By the phrase "physiological salt solution" is meant a solution containing the same concentration of salts as found in the blood plasma. The osmotic pressure of these solutions is equal to that of blood. This phrase is well known in the art. Illustrative solutions which may be employed in the preparation of the compositions of the present invention include saline (a solution of sodium chloride, containing 8.5 to 9.5 grams of salt in 1000 cc. of purified water), Ringer's solution, lactated Ringer's solution and Krebs-Ringer's solution.

As stated above, critical amounts of certain ethylene oxide-polypropylene glycol condensation products must be employed in the preparation of the compositions of the present invention. Generally, the compositions of the present invention will comprise from 0.375 to 1.5 millimoles/liter of the above-mentioned ethylene oxide-polypropylene glycol condensation products. Compositions comprising amounts of products outside of the above-cited range have been found to be unacceptable blood plasma substitutes.

The products which are operable in the present invention are prepared by condensing ethylene oxide with polypropylene glycol. A more detailed discussion of the preparation of these products is found in U.S. 2,674,619. To be useful in the present invention, the products must contain at least 50% by weight of ethylene oxide. Furthermore, the polypropylene glycol base must have a molecular weight of at least 950. It has been determined that products outside of these limits are not satisfactory blood plasma substitutes for various reasons. For example, a product containing less than 50% ethylene oxide is not sufficiently nontoxic to be useful whereas a product containing a hydrophobic base molecular weight of less than about 950 has completely different physical properties, particularly with regard to solubility, than the products useful in the present invention.

Illustrative ethylene oxide-polypropylene glycol condensation products which may be employed in the preparation of the compositions of the present invention include:

(1) 4750 molecular weight polyol containing approximately 80% by weight ethylene oxide,
(2) 3500 molecular weight polyol containing approximately 50% by weight ethylene oxide,
(3) 7800 molecular weight polyol containing approximately 80% by weight ethylene oxide,
(4) 7500 molecular weight polyol containing approximately 70% by weight ethylene oxide,
(5) 16,250 molecular weight polyol containing approximately 80% by weight ethylene oxide,
(6) 13,330 molecular weight polyol containing approximately 70% by weight ethylene oxide,
(7) 9500 molecular weight polyol containing approximately 90% by weight ethylene oxide.

In addition to being useful as blood plasma substitutes, the compositions of the present invention are useful in the treatment of fat embolism and of hyaline membrane disease of newborn infants.

The following examples illustrate the nature of the invention. All parts are by weight unless otherwise stated.

EXAMPLE I

A physiological salt solution was prepared by dissolving 0.4% by weight of a 7800 molecular weight polyol prepared by condensing ethylene oxide with a polypropylene glycol having a molecular weight of 1750, said polyol containing approximately 80% ethylene oxide in lactated Ringer's solution (0.513 millimole/liter). Ringer's lactated is a solution of 570 to 630 mg. sodium chloride, 290 to 330 mg. sodium lactate, 18 to 22 mg. calcium chloride, and 27 to 33 mg. potassium chloride in each 100 cc. of distilled water. The solution was then tested as a blood plasma substitute in the treatment of mongrel dogs in hemorrhagic shock.

Twelve dogs were subjected to hemorrhagic shock in a standardized manner as described by Wiggens and modied by Moyer et al., Archieves of Surgery, vol. 93, p. 537, October 1966, "A Bioassay of Treatment of Hemmorrhagic Shock." A group of four of these dogs was treated by returning all blood withdrawn plus two times the amount of blood withdrawn of the above salt solution. All four dogs survived without any complications. A group of eight of these dogs was treated by simply returning all blood withdrawn. Three of these dogs survived without any complication while the other five dogs expired.

EXAMPLE II

A solution was prepared by dissolving 0.4% by weight of a 7800 molecular weight polyol prepared by condensing ethylene oxide with a polypropylene glycol having a molecular weight of 1750, said polyol containing approximately 80% ethylene oxide in Ringer's lactated (0.513 millimole/liter). The solution was then employed as a priming agent in the heart-lung apparatus in a manner essentially similar to that described in an article by A. C. Hymes, N. Norimoff, and A. P. Thal, entitled "A comparison Between Mannitol Solutions and Low Molecular Weight Dextran as a Perfusate in Extracorporeal Circulation," Surgery, 59: 414–420, March 1966.

Of the 29 dogs prefused with the above solution, 27 survived (93% survival) without complications. Perfusion flow rates were high and arterial blood pH one hour post-perfusion was normal (7.33±0.06). Urine production was unimparied during and following perfusion. Plasma hemoglobin was low and averaged 30 mg. percent. Fifteen minutes post-perfusion blood volume was only 8% greater than the initial blood volume before prefusion. Following this procedure, all of the fluid within the heart-lung apparatus (now mixed with blood) was returned to the animal. The high flow rates during perfusion indicate that the osmotic pressure of the solute (polyol) was great enough to retain the solvent (water) within the vascular space during the procedure.

EXAMPLE III

A solution containing 1.0 millimole/liter of a polyol having a molecular weight of about 16,250 and containing approximately 80% ethylene oxide prepared by the reaction of ethylene oxide with a polypropylene glycol having a molecular weight of 3250 was prepared by dissolving 16.25 grams of said polyol in 10 liters of saline soluiton containing 9 grams of sodium chloride in 100 cc. of water. The solution was then employed as a priming agent in the heart-lung apparatus as described in Example II. Of the ten dogs treated nine survived. In addition, no adverse effects were noticed in the surviving dogs.

What is claimed is:

1. A physiological salt solution useful as a blood plasma substitute comprising from 0.375 to 1.5 millimoles/liter of a compound of the formula $$HO(C_2H_4O)_b(C_3H_6O)_a(C_2H_4O)_bH$$

wherein $a$ is an integer such that the hydrophobe base represented by $(C_3H_6O)$ has a molecular weight of 950 to 4000 and $b$ is an integer such that the hydrophile portion represented by $(C_2H_4O)$ constitutes from about 50% to 90% by weight of the compound.

2. The solution of claim 1 when $a$ is an integer such that the hydrophobe base represented by $(C_3H_6O)$ has a molecular weight of from 1750 to 4000.

3. The solution of claim 1 comprising from 0.375 to 1.5 millimoles of a compound of the formula $$HO(C_2H_4O)_b(C_3H_6O)_a(C_2H_4O)_bH$$

wherein $a$ is an integer such that the hydrophobe base represented by $(C_3H_6O)$ has a molecular weight of 950 to 4000 and $b$ is an integer such that the hydrophile portion represented by $(C_2H_4O)$ constitutes from about 50% to 90% by weight of the compound per liter of lactated Ringer's solution.

4. The solution of claim 1 comprising from 0.375 to 1.5 millimoles of a compound of the formula $$HO(C_2H_4O)_b(C_3H_6O)_a(C_2H_4O)_bH$$

wherein $a$ is an integer such that the hydrophobe base represented by $(C_3H_6O)$ has a molecular weight of 950 to 4000 and $b$ is an integer such that the hydrophile portion represented by $(C_2H_4O)$ constitutes from about 50% to 90% by weight of the compound per liter of saline.

References Cited

UNITED STATES PATENTS

| | | | |
|---|---|---|---|
| 2,819,199 | 1/1958 | Kalish | 424—342 |
| 3,122,478 | 2/1964 | Lafon | 424—342 |
| 3,150,043 | 9/1964 | Lafon | 424—78 |
| 3,202,578 | 8/1965 | Parker | 424—106 |
| 3,228,834 | 1/1966 | Gans et al. | 424—78 |

FOREIGN PATENTS 11,116M 2/1962 France.

STANLEY J. FRIEDMAN, Primary Examiner

U.S. Cl. X.R.

424—342